Feb. 21, 1950  E. W. SCHABER  2,498,182
MACHINE FOR OPENING EGGS AND SEPARATING THE
SHELLS OF THE EGGS AND THEIR CONTENTS
Filed June 11, 1947  3 Sheets-Sheet 1

Inventor

Elmer W. Schaber

By Clarence A. O'Brien
and Harvey B. Jacobson
Attorneys

Feb. 21, 1950 E. W. SCHABER 2,498,182
MACHINE FOR OPENING EGGS AND SEPARATING THE
SHELLS OF THE EGGS AND THEIR CONTENTS
Filed June 11, 1947 3 Sheets-Sheet 2
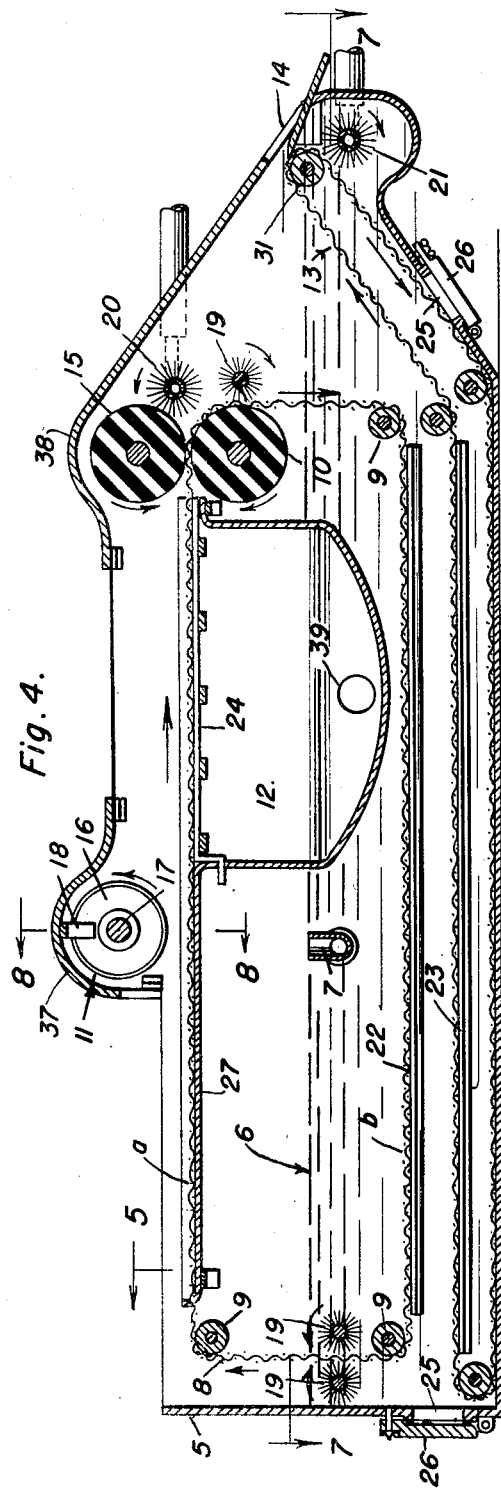
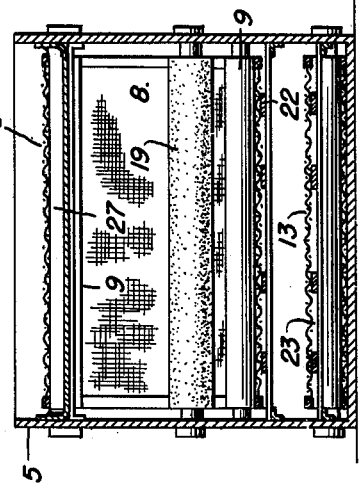
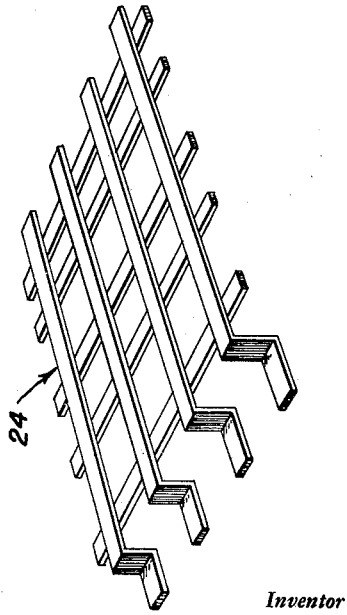
Inventor
Elmer W. Schaber
By Clarence A. O'Brien
and Harvey B. Jackson
Attorneys Feb. 21, 1950             E. W. SCHABER             2,498,182
MACHINE FOR OPENING EGGS AND SEPARATING THE
SHELLS OF THE EGGS AND THEIR CONTENTS
Filed June 11, 1947                            3 Sheets-Sheet 3
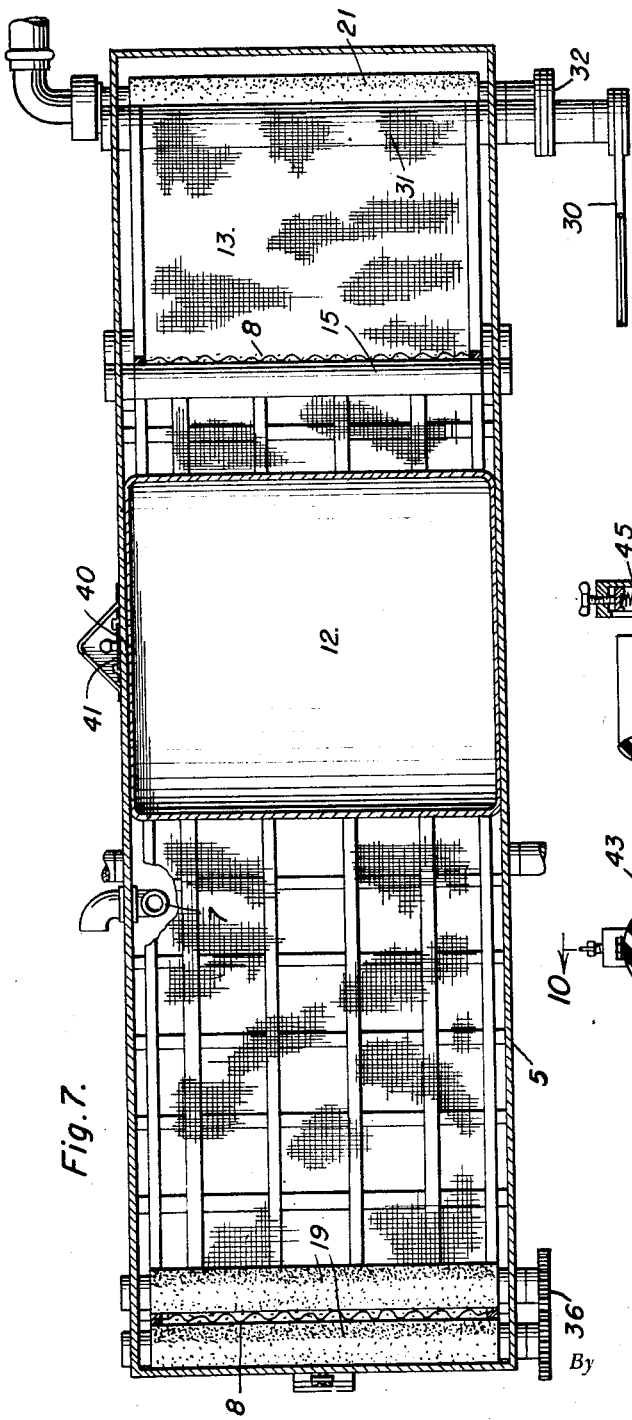
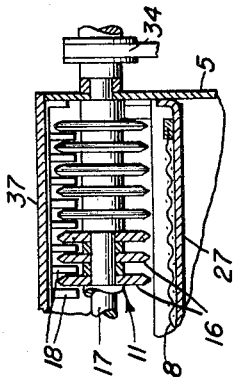
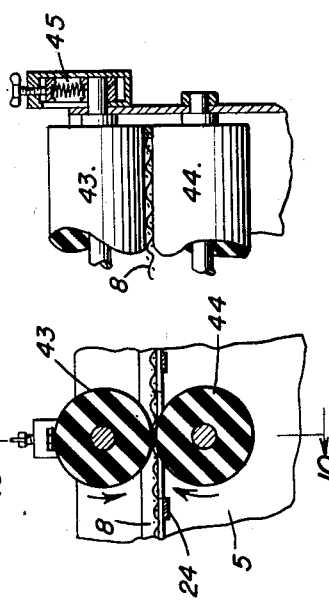
*Inventor*
Elmer W. Schaber
By *Clarence A. O'Brien and Harvey B. Jacobson*
                                     *Attorneys*

Patented Feb. 21, 1950

2,498,182

UNITED STATES PATENT OFFICE 2,498,182

MACHINE FOR OPENING EGGS AND SEPARATING THE SHELLS OF THE EGGS AND THEIR CONTENTS

Elmer W. Schaber, Sholes, Nebr.

Application June 11, 1947, Serial No. 753,836

4 Claims. (Cl. 146—2)

This invention relates to a machine primarily designed for opening eggs and separating the shells of the eggs and their contents, although the machine is adaptable to other analogous uses.

The primary object of the present invention is to provide a machine of the above kind by means of which the operations of opening the eggs and separating the shells of the eggs and their contents may be expeditiously and continuously performed in an efficient manner.

Another object of the invention is to provide a machine for automatically opening eggs and separating the shells thereof from the contents of the same, and for delivering the contents and shells separately from the machine.

A further object is to provide an improved machine of the above kind which is comparatively simple in construction and highly efficient in operation.

The exact nature of the present invention will become apparent from the following description when considered in connection with the accompanying drawings, in which:

Figure 4 is a longitudinal section taken on line 4—4 of Figure 1 and drawn on an enlarged scale.

Figure 5 is a transverse vertical section taken on line 5—5 of Figure 4.

Figure 6 is a perspective view of the slatted support for the carrier belt provided at the top of the receptacle which receives the contents of the egg shells.

Figure 7 is a horizontal section taken on line 7—7 of Figure 4.

Figure 8 is a fragmentary vertical transverse section taken on line 8—8 of Figure 4.

Figure 9 is a fragmentary sectional view showing the manner in which rollers may be provided at the top of the receptacle and in association with the upper run of the carrier belt when the machine is employed for splitting fruit and expressing juice therefrom.

Figure 10 is a fragmentary section taken on line 10—10 of Figure 9.

Figure 1:
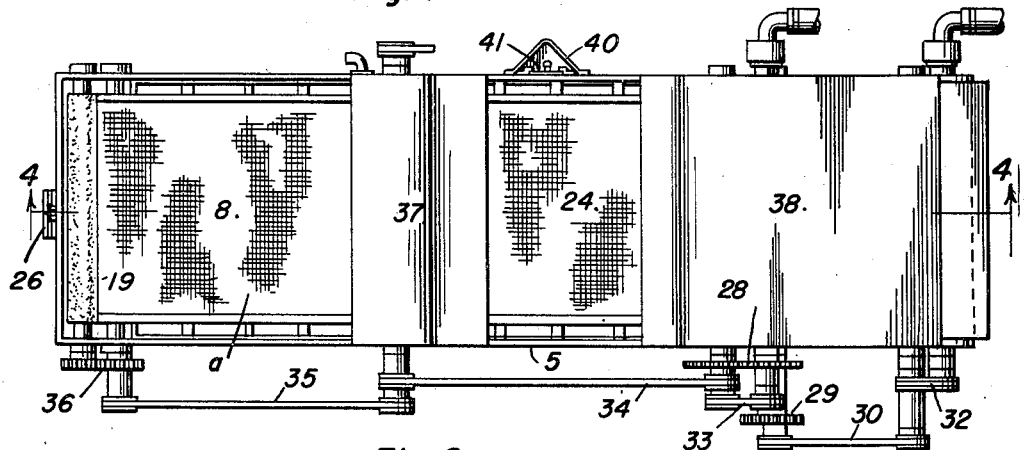
Figure 1 is a top plan view of a machine constructed in accordance with the present invention.

Referring in detail to the drawings, the present machine includes a horizontally elongated open top casing 5 which is in the nature of a tank adapted to contain water to a predetermined level as indicated at 6 in Figure 4 and provided with means, such as an overflow pipe 7 for maintaining the water at such level. An endless foraminous carrier belt 8 passes around idler rollers 9 and a driving roller 10 so as to be movable in a vertical orbital path within the casing 5 and so as to provide an upper horizontal run at $a$ which moves longitudinally of the casing near the top of the latter and is adapted to have eggs deposited on the end thereof which is at the left of Figures 1, 2 and 4. A gang disk cutter 11 is arranged above the upper run $a$ of the carrier belt in position for splitting the shells of the eggs as they move toward the other end of said run.

An open top receptacle 12 is arranged beneath the upper run $a$ of the carrier belt to receive the contents of the shells after the latter are split by the cutter 11, and an endless conveyor 13 is arranged to receive the shells as they are discharged from the carrier belt 8 at said other end of the run $a$, and to deliver said shells from the casing at the end outlet at 14.

The carrier belt 8 and the apron or conveyor 13 are preferably made of wire mesh fabric, and the belt 8 is driven by the friction roller 10 and another similar friction roller 15 coacting therewith, the belt 8 passing between said rollers 10 and 15 as shown. The cutter 11 preferably consists of a plurality of cutter disks 16 secured upon a rotary driven shaft 17 in spaced relation as more clearly shown in Figure 8. Fingers 18 are fixedly mounted to project downwardly between the cutter disks 16 and keep the spaces therebetween clear of egg shells.

The carrier belt 8 has a lower run $b$ which passes beneath the receptacle 12, and the conveyor 13 extends beneath said lower run $b$. The water level 6 is at a point between the runs $a$ and $b$, and such water acts to wash adhered portions of the contents of the egg shells from the carrier belt and the conveyor 13. Brushes 19 are provided for removing adhered portions of the egg shell contents from the carrier belt 8, and other brushes 20 and 21 are provided for a similar purpose in connection with the roller 15 and the conveyor 13. The latter brushes are of the fountain type suitably supplied with water under pressure through the hollow shafts thereof, and all of the brushes are of cylindrical form and of the driven rotary kind. Suitable slatted supports 22 and 23 are provided to prevent sagging of the lower run $b$ and the upper run of conveyor 13. Another slatted support 24 is provided for the upper run $a$ at the top of the receptacle 12. Near the bottom, and at each end, casing 5 is provided with a clean-out opening 25 provided with a suitable water-tight closure 26.

A drain board 27 extends beneath a portion of the run *a* from a point in advance of the cutter 11 to the receptacle 12.

The shafts of roller 10 and brush 20 are inter-geared as at 28, and the shafts of brushes 19 and 20 are inter-geared as at 29. A belt gearing 30 is provided between the shaft of brush 19 and the shaft of a roller 30 provided at the discharge end of conveyor 13 and about which the apron of said conveyor 13 passes. Another belt gearing 32 is provided between the shaft of roller 31 and the shaft of brush 21. Still another belt gearing 33 is provided between the shaft of brush 20 and the shaft of roller 15. A belt gearing 34 is provided between the shaft of roller 15 and the shaft 17 of cutter 11. Belt gearing 35 connects the shaft of cutter 11 with the shaft of one of the brushes 19 at the receiving end of the machine, the shafts of the latter brushes being inter-geared as at 36. Any one of the shafts may be driven by a motor, not shown, thereby causing rotation and movement of the various parts in the directions indicated by the arrows. Suitable shields or guards 37 and 38 are respectively provided over the cutter 11 and roller 15.

Figure 2:
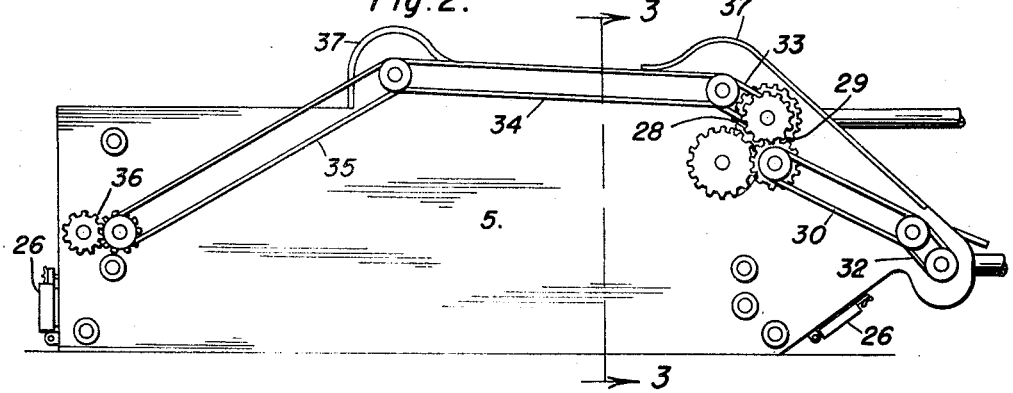
Figure 2 is a side elevational view thereof.
Figure 3:
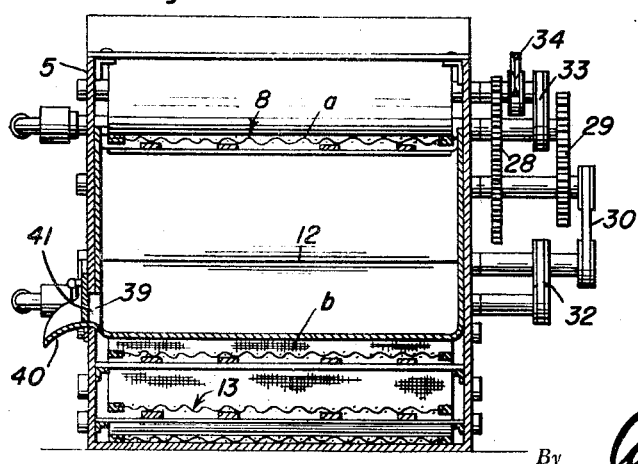
Figure 3 is a vertical transverse section taken on line 3—3 of Figure 2.

As more clearly shown in Figures 1 and 3, the receptacle 12 has a bottom outlet 39 at one side which communicates with a discharge spout 40 on the outside of casing 5. Communication between the outlet 39 and spout 40 is controlled by a gate valve 41 which may be opened from time to time for discharging the contents from the receptable 12.

In operation, the eggs are suitably delivered onto the run *a* of carrier belt 8 in advance of the cutter 11. Assuming that the various parts are being driven, the eggs are carried past the cutter 11 so that the latter splits the shells thereof and releases the contents of said shells. The said contents flow through the belt 8 into the receptacle 12 for collection, and the shells are carried past said receptacle 12 by belt 8 between the rollers 10 and 15 for being crushed and discharged from belt 8 onto conveyor 13. Conveyor 13 delivers the shells from the machine through the outlet 14. Any shell fragments or other matter washed from the lower run *b* of belt 8 will also be carried from the machine by conveyor 13 as the latter extends completely under the run *b* as shown. Brushes 19, 20 and 21 keep the belt 8, roller 15 and conveyor 13 free of shells and the like so that a clean and sanitary condition maintains. The water in the casing 5 is constantly changed due to the continuous supply of water thereto from the brushes 20 and 21 and the continuous overflow of water from the casing 5 through the overflow pipe 7. From time to time, the contents of the egg shells may be withdrawn from receptacle 12 through outlet 39 and spout 40.

In case the machine is desired to be used for splitting fruit and expressing juice from the fruit, coacting rollers 43 and 44 may be journalled across the top of receptacle 12 above and below the run *a* of belt 8 as shown in Figures 9 and 10, the upper roller 43 being yieldingly pressed toward the lower roller 44 by yieldable means generally indicated at 45 and well-known in the art of fruit juicing machines. When these coacting press rollers 43 and 44 are employed as described, the fruit may be deposited on the run *a* in advance of cutter 11. As the fruit is carried past said cutter they are split by the latter, and the fruit sections are then pressed between the rollers 43 and 44 so as to express the juice therefrom into receptacle 12. The fruit skins are then delivered past the receptacle 12 by belt 8 and discharged from the latter onto conveyor 13 for delivery from the machine.

From the foregoing description, it is believed that the construction, operation and advantages of the present invention will be readily understood and appreciated by those skilled in the art.

Having described the invention, what is claimed as new is:

1. In a machine for opening eggs and separating the shells of the eggs and their contents, the combination of a horizontally elongated open top casing, an endless foraminous carrier belt movable in a vertical orbital path within said casing so as to provide an upper horizontal run moving longitudinally of the casing near the top of the latter and adapted to have the eggs deposited on one end thereof, a gang disk cutter arranged above said upper run for splitting the shells of the eggs as they move toward the other end of said run, an open top receptacle provided with a valve controlled bottom outlet leading outwardly through one side of the casing, said receptacle being arranged beneath said run to receive and collect the liquid contents of the shells after the latter are split by said cutter, and an endless conveyor arranged beneath said carrier belt to receive the shells as they are discharged from said carrier belt at said other end of said run and to deliver said shells from the casing, said carrier belt having a lower run passing beneath said receptacle, said conveyor extending beneath said lower run, said casing comprising a tank adapted to contain water to a level between said upper and lower runs for washing adhered portions of the contents of the egg shells from said carrier belt and said conveyor, and brushes for removing said adhered portions from the carrier belt and the conveyor, at least one of said brushes being of the fountain type supplied with water under pressure.

2. The construction defined in claim 1, in combination with upper and lower friction driving rollers for said carrier belt arranged to crush the egg shells at said other end of the upper run, and a fountain brush supplied with water under pressure and arranged to clean the upper driving roller.

3. In a machine of the character described, the combination of a horizontally elongated open-top casing, an endless foraminous carrier belt movable in a vertical orbital path within said casing so as to provide an upper horizontal run moving longitudinally of the casing near the top of the latter and adapted to have liquid containing articles deposited on one end thereof, a gang disk cutter arranged above said upper run for splitting the articles as they move toward the other end of said run, an open-top receptacle provided with a valve controlled bottom outlet leading outwardly through one side of the casing, said receptacle being arranged beneath said run to receive and collect the liquid contents of the articles after the latter are split by said cutter, an endless conveyor arranged beneath said carrier belt to receive the liquid containing portions of said articles as they are discharged from said carrier belt at said other end of said run and to deliver the same from the casing, said carrier belt having a lower run passing beneath said receptacle, said conveyor extending beneath said lower run, said casing comprising a tank adapted to contain water to a level between said upper and lower runs for washing adhered portions of the contents of the articles from said carrier belt and from said conveyor, and brushes for removing such adhered portions from the carrier belt and the conveyor.

4. In a machine of the character described, the combination of a horizontally elongated open top casing, an endless foraminous carrier belt movable in a vertical orbital path within said casing so as to provide an upper horizontal run moving longitudinally of the casing near the top of the latter and adapted to have deposited on one end thereof liquid-containing articles to be split, a gang disk cutter arranged above said upper run for splitting the articles as they move toward the other end of said run, an open top receptacle provided with a valve controlled bottom outlet leading outwardly through one side of the casing, said receptacle being arranged beneath said run to receive and collect the liquid contents of said articles after the latter are split by said cutter, an endless conveyor arranged beneath said carrier belt to receive the solid portions of said articles as they are discharged from said carrier belt at said other end of said run and to deliver them from the casing, said carrier belt having a lower run passing beneath said receptacle, said conveyor extending beneath said lower run, said casing comprising a tank adapted to contain water to a level between said upper and lower runs, and brushes for cleaning the carrier belt and the conveyor, at least one of said brushes being of the fountain type supplied with water under pressure.

ELMER W. SCHABER.

REFERENCES CITED

The following references are of record in the file of this patent:

UNITED STATES PATENTS

| Number | Name | Date |
|---|---|---|
| 416,704 | Holland | Dec. 3, 1889 |
| 698,523 | Kohlhepp et al. | Apr. 29, 1902 |
| 864,829 | Callow | Sept. 3, 1907 |
| 1,729,611 | Forrest | Oct. 1, 1929 |
| 1,795,118 | Hall | Mar. 3, 1931 |
| 2,010,467 | Rowan | Aug. 6, 1935 |

FOREIGN PATENTS

| Number | Country | Date |
|---|---|---|
| 116,661 | Australia | Mar. 18, 1943 |